United States Patent [19]

Erskine et al.

[11] Patent Number: 5,805,119
[45] Date of Patent: Sep. 8, 1998

[54] VEHICLE PROJECTED DISPLAY USING DEFORMABLE MIRROR DEVICE

[75] Inventors: James Christian Erskine, Birmingham; Dale Lee Partin, Ray, both of Mich.

[73] Assignee: General Motors Corporation, Detroit, Mich.

[21] Appl. No.: 960,148

[22] Filed: Oct. 13, 1992

[51] Int. Cl.⁶ ........................................ G09G 5/00
[52] U.S. Cl. ................... 345/7; 359/630; 345/136
[58] Field of Search ...................... 340/705, 783; 359/630, 291, 850, 855, 224; 345/136, 135, 134, 133, 147, 7, 9

[56] References Cited

U.S. PATENT DOCUMENTS

| | | | |
|---|---|---|---|
| 2,750,833 | 6/1956 | Gross . | |
| 4,486,785 | 12/1984 | Lasher et al. | 345/136 |
| 4,571,603 | 2/1986 | Hornbeck et al. | 346/160 |
| 4,638,309 | 1/1987 | Ott | 340/752 |
| 4,680,579 | 7/1987 | Ott | 340/783 |
| 4,691,093 | 9/1987 | Banas et al. | 219/121 |
| 4,793,699 | 12/1988 | Tokuhara | 350/487 |
| 4,804,836 | 2/1989 | Iino | 340/705 |
| 4,830,464 | 5/1989 | Cheysson et al. | 340/705 |
| 4,859,012 | 8/1989 | Cohn | 350/96 |
| 4,880,287 | 11/1989 | Moss | 359/630 |
| 4,940,318 | 7/1990 | Ealey et al. | 350/611 |
| 4,950,881 | 8/1990 | Kaltschmidt | 250/203 |
| 5,018,256 | 5/1991 | Hornbeck | 29/25 |
| 5,022,745 | 6/1991 | Zayhowski et al. | 350/608 |
| 5,037,173 | 8/1991 | Sampsell et al. | 385/17 |
| 5,037,184 | 8/1991 | Ealey | 359/849 |
| 5,037,190 | 8/1991 | Ealey et al. | 350/610 |
| 5,041,851 | 8/1991 | Nelson | 346/160 |
| 5,068,203 | 11/1991 | Logsdon et al. | 437/89 |
| 5,072,239 | 12/1991 | Mitcham et al. | 346/108 |
| 5,083,857 | 1/1992 | Hornbeck | 359/224 |
| 5,121,099 | 6/1992 | Hegg et al. | 340/705 |
| 5,168,406 | 12/1992 | Nelson | 359/855 |
| 5,200,844 | 4/1993 | Suvada | 340/705 |

OTHER PUBLICATIONS

Folded Spectrum Analysis Using A Frame–Addressed Deformable Mirror Device, SPIE vol. 1296, Advances In Optical information Processing IV (1990), pp. 201–205.

Deformable Mirror Light Modulators For Image Processing, SPIE vol. 1151, Optical Information Processing Systems & Architectures (1989) pp. 183–194.

Deformable–Mirror Spatial Light Modulators, SPIE Critical Reviews Series Vol. 1150 (1989), pp. 86–102.

*Primary Examiner*—Vivian Chang
*Attorney, Agent, or Firm*—Anthony Luke Simon

[57] ABSTRACT

An apparatus comprising a light source and a deformable mirror device including a matrix of individually controllable mirrors, each controllable mirror having first state reflecting light from the light source into a light path and a second state reflecting light from the light source away from the light path. An optical element is disposed in the light path projecting a virtual image of the deformable mirror device wherein the virtual image conveys information to a viewer of the projected image.

3 Claims, 12 Drawing Sheets

VEHICLE PROJECTED DISPLAY USING DEFORMABLE MIRROR DEVICE

This invention pertains to projected displays and more particularly to projected displays suitable for use in motor vehicles.

BACKGROUND OF THE INVENTION

Head-up displays have long been used in aircraft to aid pilots. The head-up display reflects information the pilot needs off of a half mirror or the windshield and projects that information at a distance in front of the plane so that the pilot does not have to look into the cockpit to see the information. More recently, head-up displays have been used in automotive applications in which the image is projected up and reflected off of the vehicle front windshield to appear at a distance in front of the driver. In such cases, the front windshield is used as a combiner allowing the head-up display image to appear together with the view through the front windshield. With a head-up display in a vehicle, the driver does not have to adjust his/her eyes from the road to read information such as vehicle speed, which is normally displayed in the vehicle instrument panel.

One desirable trait for head-up displays is an image source bright enough to project an image visible to the vehicle operator even during the brightest daylight hours. In some systems, image brightness is enhanced by a reflective coating or a holographic film on the vehicle windshield, increasing the brightness of the projected display. However, many designers prefer not to have to treat the windshield to increase display brightness.

Another desirable trait for vehicle head-up displays is a re-configurable image. A re-configurable head-up display can be provided by an image source such as a bright CRT. However, CRT's are bulky and expensive. Other proposals have included using re-configurable liquid crystal matrix displays. Such displays are difficult to light brightly while maintaining high contrast, are sensitive to temperature changes, and may be easily overheated. Still other proposals have included re-configurable vacuum fluorescent displays.

What is desired is a low cost, re-configurable head-up display with high brightness and high contrast.

SUMMARY OF THE PRESENT INVENTION

This invention provides a very high brightness, high contrast, low cost re-configurable virtual image display apparatus and method for vehicles by using a deformable mirror device as the image source. Advantageously, the apparatus of this invention provides a head-up display image source that is easy to light brightly, insensitive to temperature changes and resistant to over-heating from the light source. Advantageously, the head-up display device of this invention provides an image source that can be used to provide a head-up display image in a single color, with a gray scale, or in full color. Advantageously, the apparatus of this invention provides a head-up display device with minimum power consumption and minimum space requirements.

Structurally, this invention comprises a light source emitting light and a deformable mirror device comprising a matrix of controllable mirrors. Each mirror in the matrix is controllable between at least two states, the first state being a state of reflecting light into a light path and the second state being a state of reflecting light away from the light path. The deformable mirror device is mounted to receive light from the light source and an optical element is placed in the light path to project an image viewable by a vehicle operator. A more detailed description of this invention, along with various implementations thereof, are set forth in the detailed description below.

DETAILED DESCRIPTION OF THE INVENTION

Figure 1:
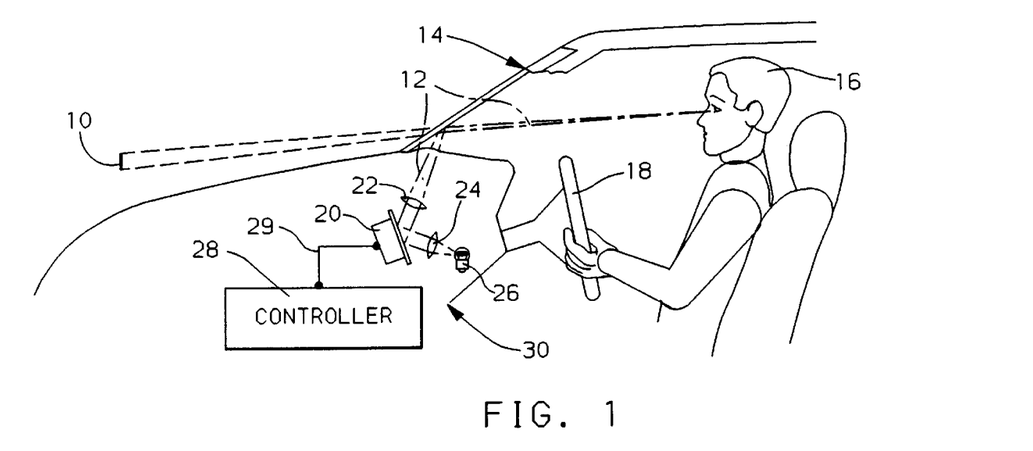
FIG. 1 illustrates the apparatus of this invention in a vehicle head-up display.

Referring to FIG. 1, the apparatus of this invention includes light source 26, deformable mirror device 20 and an optical element, which as shown is the vehicle windshield 14. The light source 26 emits light that is focused by lens 24 onto deformable mirror device 20.

Deformable mirror device 20 comprises a matrix of controllable mirrors, each mirror having at least first and second states. Each mirror in the first state reflects light from light source 26 into the light path 12, which light is then reflected off of vehicle windshield 14 and appears to the driver 16 as virtual image 10. Each mirror in the first state appears in the projected image as a bright pixel, or a small point of light. Each mirror in the second state reflects the light from light source 26 away from the light path 12. Each mirror in the second state appears in the projected image as a dark pixel, or a small point that does not emit light, providing contrast to the mirrors in the first state. A lens 22 may be used to focus and/or magnify the image source 20. Preferably, virtual image 10 is projected above the front bumper of the vehicle.

A color filter may be placed between light source 26 and deformable mirror device 20 or between deformable mirror device 20 and windshield 14 to control the color of virtual image 10.

Deformable mirror device 20, including its matrix of individually controllable mirrors, is manufactured on a semiconductor device and enclosed in a housing with a transparent cover. The manufacture of deformable mirrors devices, often referred to as "digital mirror devices," is well known to those skilled in the art. The deformable device mirror 20 may be controlled through control bus 29 driving a matrix of semiconductor drivers integrally manufactured on the substrate of deformable mirror device 20. Electronics 28 provides the control signals for bus 29 driving the deformable mirror device 20. The entire apparatus including the electronics 28, light source 26 and deformable mirror device 20 may be incorporated into the instrument panel 30 of the motor vehicle.

Deformable mirror device 20 may alternatively be fabricated using thin film transistors deposited on the surface of an insulating substrate, in a manner similar to the fabrication of active matrix displays. In short any matrix-addressable deformable mirror device may be used.

Figure 2:
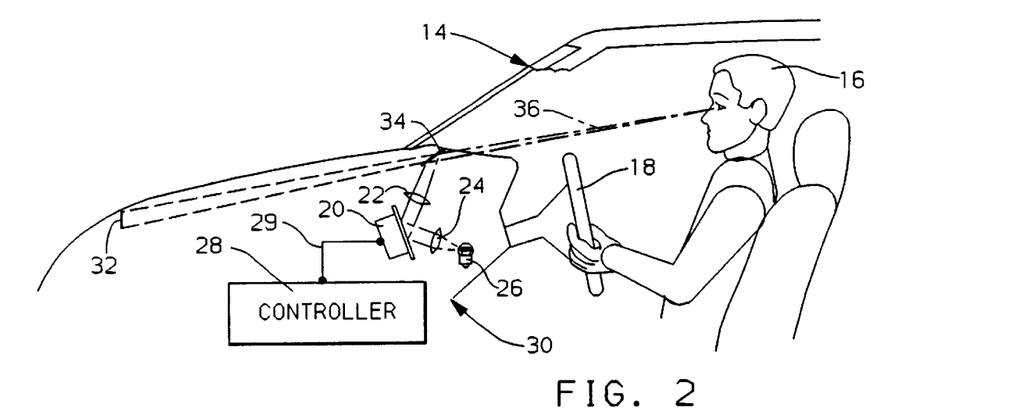
FIG. 2 illustrates the apparatus of this invention in a vehicle virtual image display.

FIG. 2 shows another implementation of the apparatus of this invention in which the optical element includes spherical mirror 34. Spherical mirror 34 is placed in the light path 36 to reflect an image in the deformable mirror device 20 as virtual image 32 viewable by the vehicle operator 16. In this implementation, the display apparatus provides high brightness, high contrast projected image 32 that is not superimposed over scenery viewed through the windshield 14.

Figure 3:
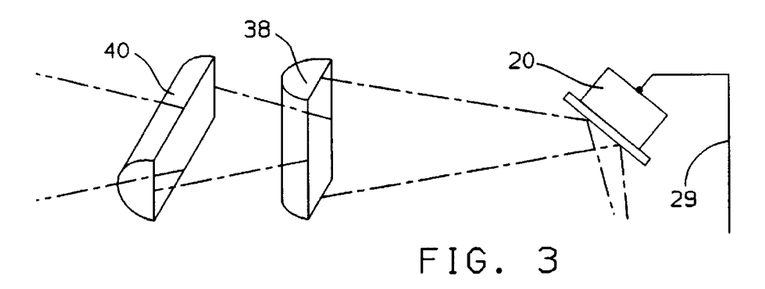
FIG. 3 is an example lens arrangement for use with this invention.

FIG. 3 shows an example lens arrangement for placement between the deformable mirror device 20 and the optical element. Two cylindrical lenses 38 and 40 are used to magnify the projected image of the deformable mirror device. For example, assuming the deformable mirror device is a 64×40 re-configurable matrix, the required silicon space for such a matrix is approximately 2 mm×2 mm. Although the optical element, such as spherical mirror 34 and vehicle windshield 14, provides some magnification of the image, the lenses 38 and 40 provide increased magnification of the image, if so desired. Lenses 38 and 40 comprise semi-cylindrical lenses with the cylindrical axis of lens 38 perpendicular to the cylindrical axis of lens 40. Implementation of the lenses 38 and 40 may be easily accomplished by those skilled in the optical arts, along with implementation of alternative lens configurations with equivalent functions.

Figure 4:
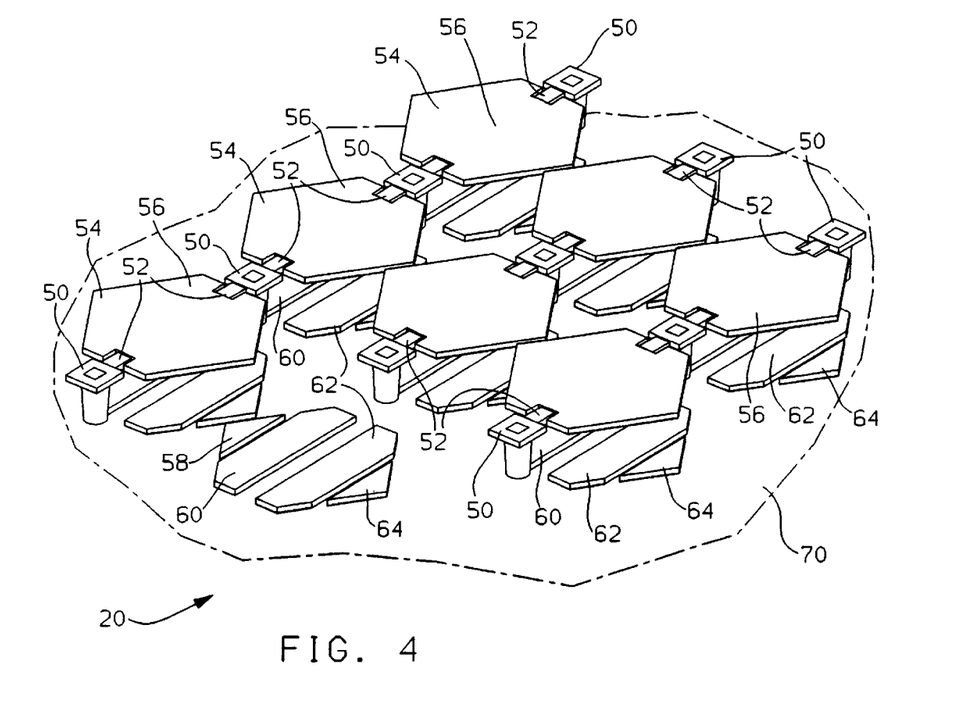
FIG. 4 is a view of a portion of a matrix of mirrors of a deformable mirror device used with this invention.

Referring to FIG. 4, a portion of the deformable mirror device 20 is shown including a portion of the matrix of mirrors. The deformable mirror device 20 shown is an electrostatic device. Each mirror on the deformable mirror device 20 includes beam 54, mirror surface 56, torsion hinges 52 and posts 50. Each beam 54 is supported between two posts 50 by two torsion hinges 52. Mirror surface 56 may comprise tither a mirror coating or, more simply, a polished surface. The beams, torsion hinges and posts 54, 52 and 50 are manufactured monolithically on a silicon wafer, which contains the pixel addressing transistors and circuits. The mirrors are mounted on substrate 70 comprising electrode plates 58, 60, 62 and 64 and various electronics such as the required connectors and if desired, drive transistors for matrix control of the plates. The manufacture of the requisite electronics into the substrate is well known to those skilled in the art.

One of the mirrors including beam 54, hinges 52 and posts 50 is omitted so that the pattern of the electrodes 58, 60, 62 and 64 may be seen. Electrodes 60 and 62 are large electrodes for generating electrostatic fields and electrodes 58 and 64 are smaller in size for serving as contact electrodes.

Figure 5:
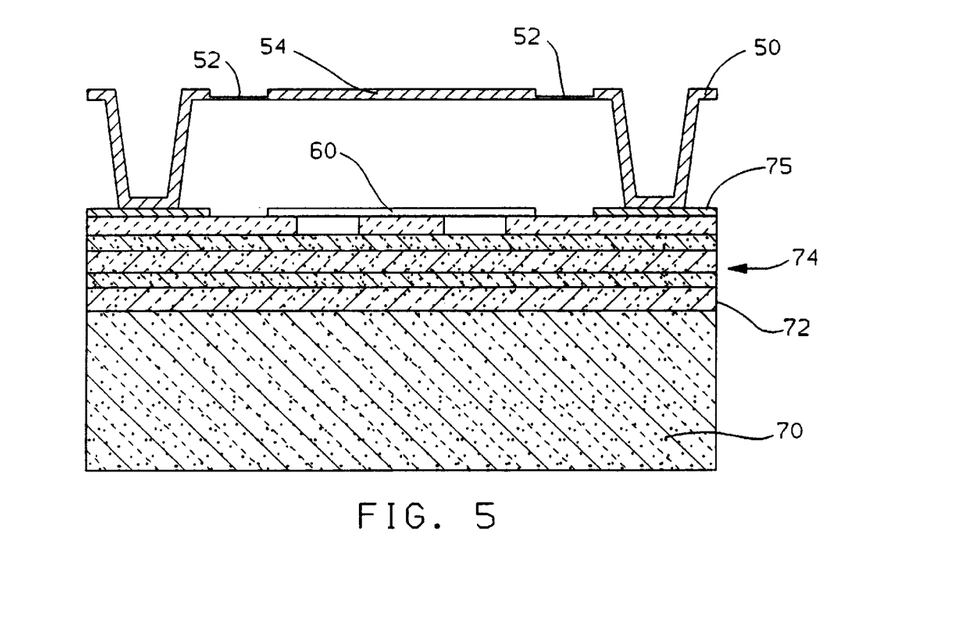
FIG. 5 is another view of a portion of the deformable mirror device.

FIG. 5 shows another view of the deformable mirror device including the substrate 70, insulation layer 72 and 74, electrodes 75, posts 50, hinges 52 and beam 54. The addressing transistors are manufactured into the surface of wafer substrate 70.

Figure 6A:
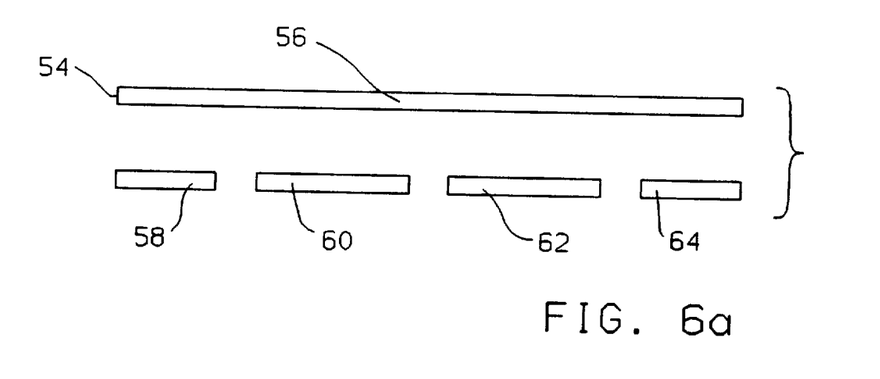
FIGS. 6A, 6B, and 6C illustrate the operation of one type of deformable mirror device.
Figure 6B:
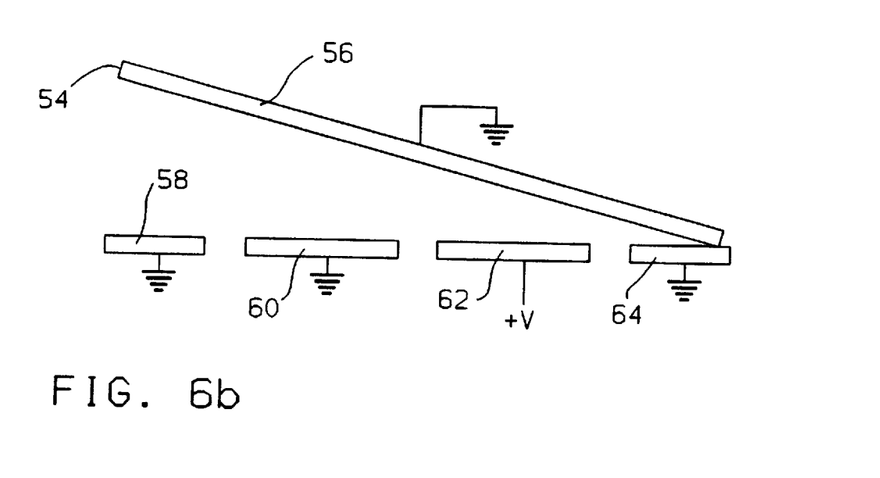
Figure 6C:
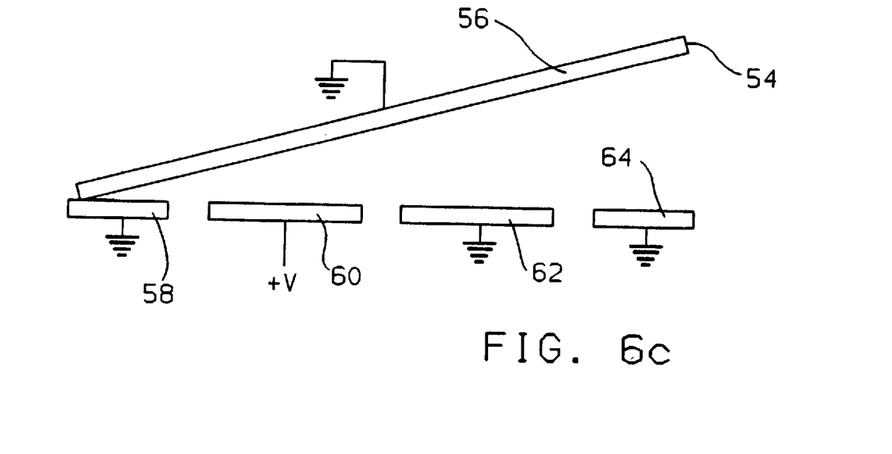

FIGS. 6A, B, and C illustrate the operation of the electrostatic mirrors comprising the deformable mirror device shown in FIGS. 4 and 5. FIG. 6A shows a beam 54 held in the neutral position by the torsion hinges 52 (FIGS. 4 and 5). In operation, beam 54 and landing electrodes 58 and 64 are grounded. Mirror 56 and beam 54 are rotated either clockwise (FIG. 6B) or counter clockwise (FIG. 6C) by applying a charge (usually positive) to electrode 62 or electrode 60. To rotate mirror 56 clockwise, address electrode 62 is made positive and address electrode 60 is grounded. To rotate the mirror counter clockwise, the voltages are reversed, i.e., electrode 60 is made positive and electrode 62 is grounded. Electrostatic forces cause the rotation of the beam 54 and mirror 56.

Figure 7:
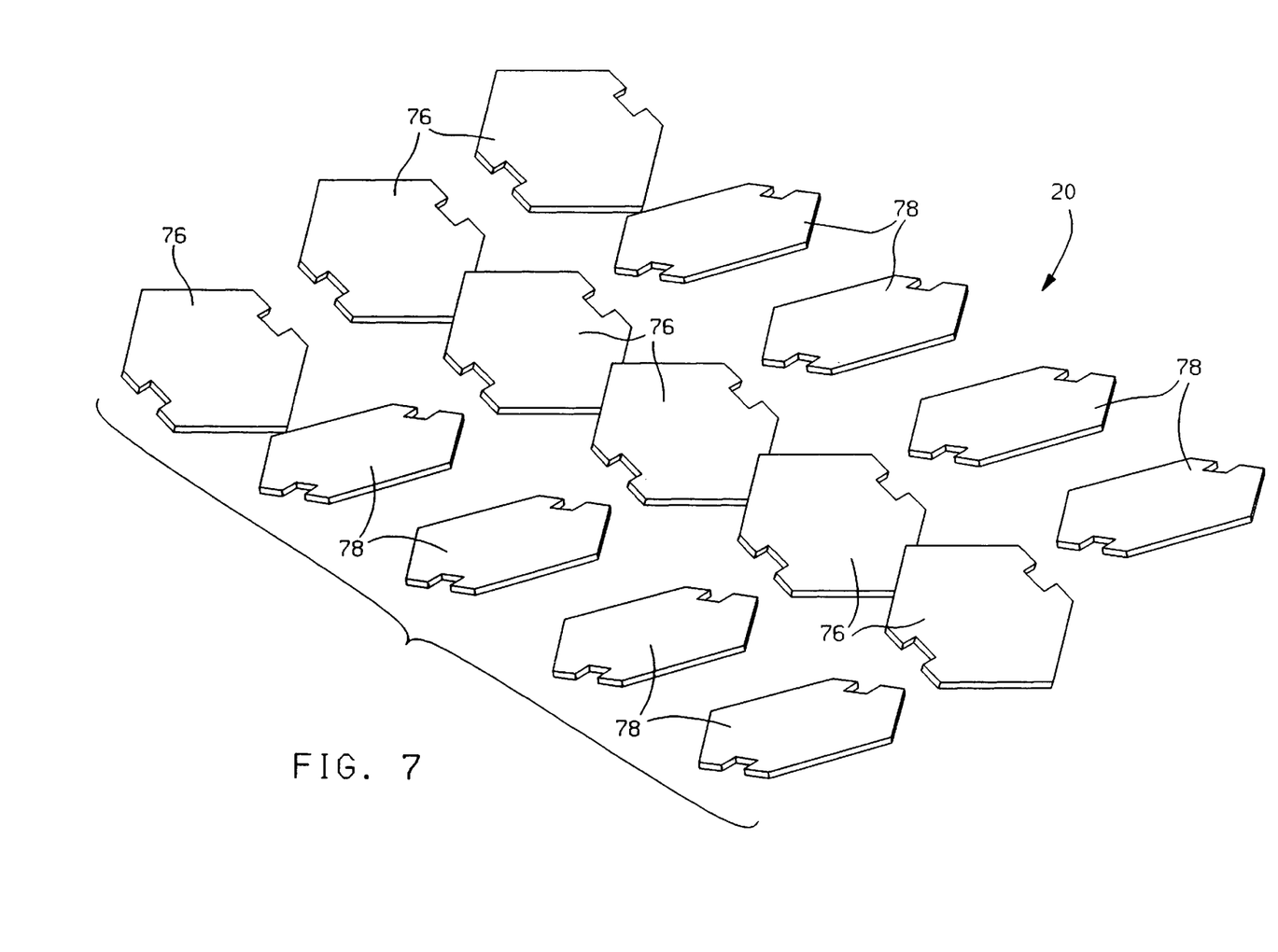
FIG. 7 is a view of a portion of a matrix of mirrors of a deformable mirror device showing the mirrors selectively controlled in the first and second states.

FIG. 7 illustrates a portion of the matrix of mirrors, with the mirrors indicated by reference 76 controlled to be in the first state and the mirrors indicated by reference 78 controlled to be in the second state. To use the deformable mirror device 20 in a re-configurable display, a light source is provided as shown in FIGS. 1 and 2, so that the mirrors in one of the states, for example in the first state 76, reflect light from the light source into a light path to be seen by the driver. In this example, the mirrors in the first state appear in the image as illuminated dots. The mirrors in the second state reflect the light from the light source away from the path leading to the driver's eye and possibly into a light trap to prevent further reflection of the light. Mirrors in the second state appear dark or non-light-emissive and do not provide light in the projected image viewed by the driver.

The operation of the deformable mirror device 20 illustrated in FIG. 7 is a two-state operation. The deformable mirror device 20 may also be operated in a tri-state mode, in which the position of the mirror parallel to the substrate is the third state of each mirror.

Figure 8:
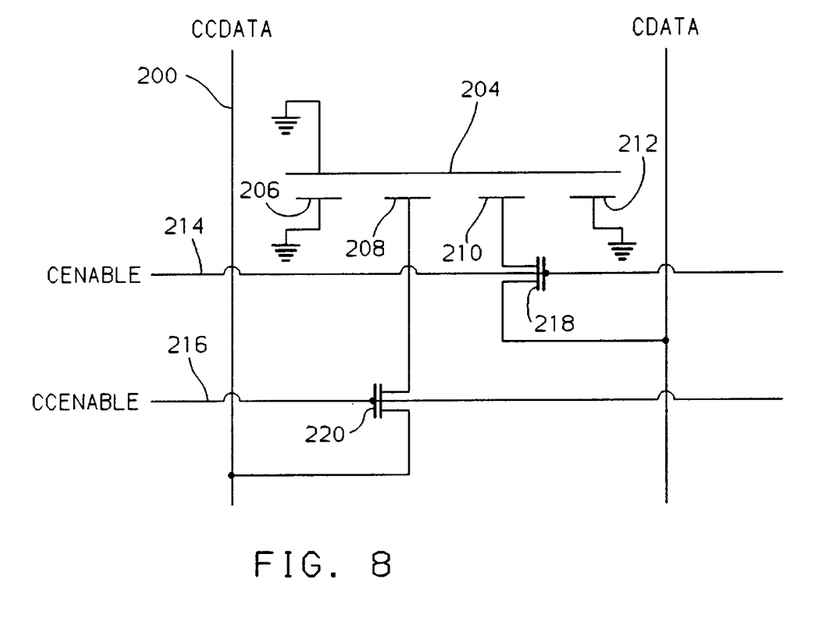
FIG. 8 is a circuit diagram of one pixel of a deformable mirror device.

FIG. 8 illustrates an example circuit of a single pixel of a deformable mirror device. Two transistors 218 and 220 are located at each mirror 204 in the array of mirrors. The purpose of each transistor 218, 220 is to provide a sample-and-hold function at each point of the array to hold the mirror drive voltage on the mirror during the time the rest of the frame is addressed. Transistors 218 and 220 are similar to thin film transistors in active matrix liquid crystal displays, which hold selected voltages on liquid crystal pixels during frame addressing. Without the sample and hold operation, the mirrors would swing back to the rest position after the addressing voltage is removed. Cross talk on the matrix lines would also cause spurious mirror deflections. Since transistors are active devices, i.e., they can amplify signals, the array of transistors located at the mirrors is called an active matrix.

To address the active matrix, one set of orthogonal electrodes (i.e., 214, 216) enables an entire line of pixels to be addressed at one time. The other set of orthogonal electrodes (i.e., lines 200, 202) carries the addressing data for that line of pixels. This method is referred to as line-at-a-time addressing. After the data is captured by the sample and hold transistors (218, 220) at each pixel in the line, the voltage enabling the capture of the data (lines 214, 216) is reduced to zero and the next line is enabled. The entire array of display elements in the array is thus addressed a line at a time.

Figure 9:
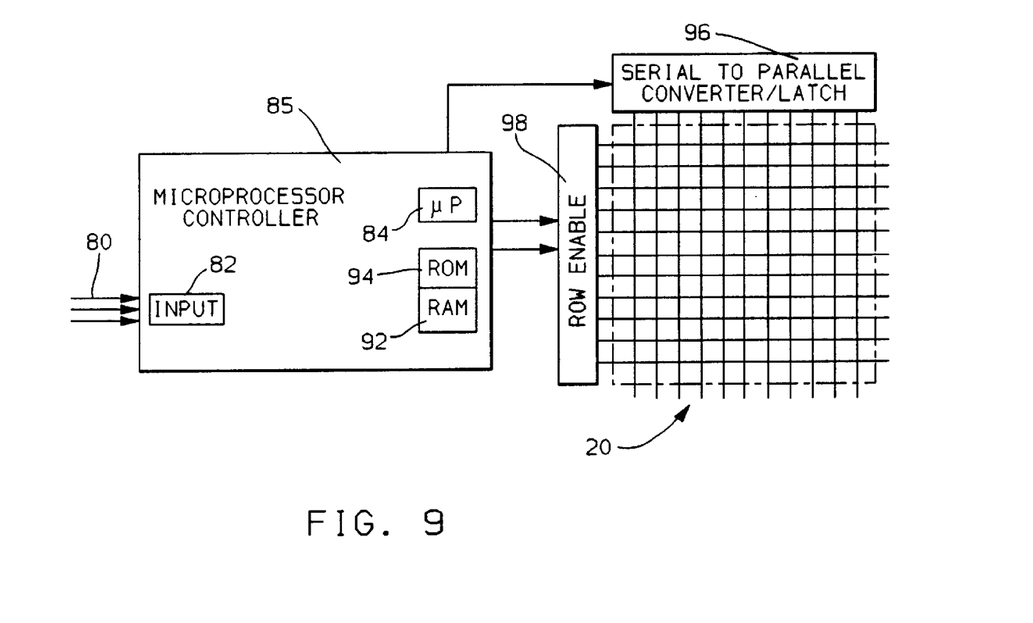
FIG. 9 is a view of a control system for use with this invention.

FIG. 9 illustrates an example electronic system for control of the deformable mirror 20. The electronic control system includes microprocessor controller 85 comprising microprocessor 84, input unit 82, random access memory 92, and read-only memory 94, and includes row enabling circuit 98 and serial to parallel converter/latch 96.

In general, the read-only memory 94 stores a control program executed by microprocessor 84. Electronic signals representing data to be displayed are received on lines 80, which are coupled to input unit 82. The received signals are provided to microprocessor 84, which responsively determines the image to be displayed on deformable mirror device 20 as a set of pixel commands and stores the pixel commands in random access memory 92. Developing the pixel commands is easily accomplished by those skilled in the arts pertaining to re-configurable displays.

Microprocessor 84 generates the drive signals for row enabling circuitry 98 and serial to parallel converter/latch 96 in response to the stored pixel commands. Row enabling circuit 98 and serial to parallel converter/latch 96 are circuits well known to those skilled in the art of active matrix displays. Circuits 96 and 98 are preferably fabricated onto the same silicon substrate as the pixel control transistors, and located at the edge or periphery of the deformable mirror device mirror array. The circuits 96 and 98 are coupled to the deformable mirror device 20 through row and column connectors, with each row of mirrors having two row connectors and each column of mirrors having two column connectors.

Each mirror in deformable mirror device 20 represents one pixel and deformable mirror device 20 is controlled by selectively controlling each mirror through a scanning of the rows and columns in the device.

Figure 10:
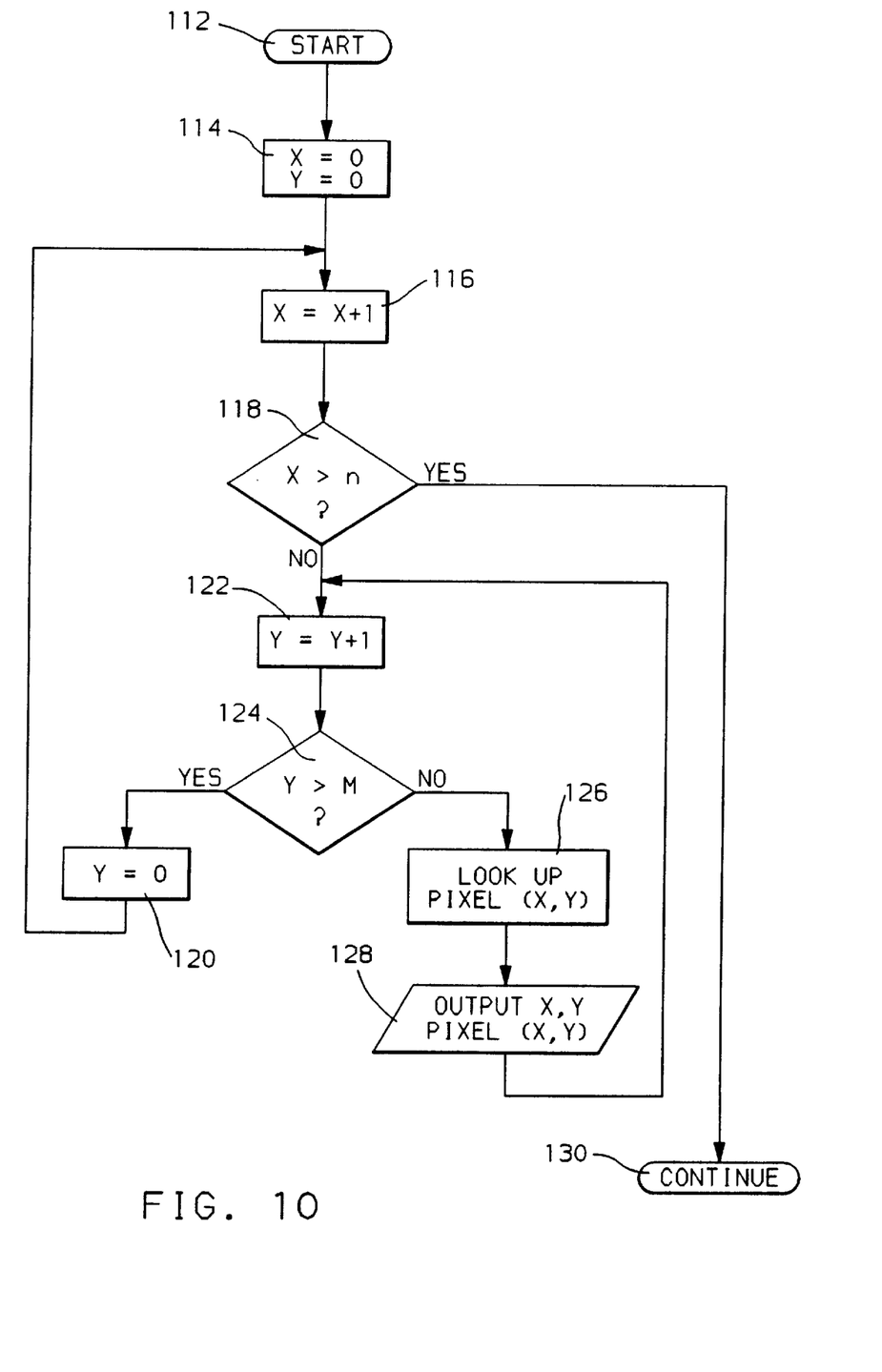
FIGS. 10 and 11 are flow diagrams for use with microprocessor implementations of this invention.

FIG. 10 shows a portion of a control routine that may be executed by microprocessor 84 to scan the individual mirrors of the deformable mirror device 20. The routine starts at block 112 and moves to block 114 where it sets the X and Y variables to zero. At block 116, X is incremented and at block 118 X is compared to the maximum number of rows, n. If X is greater than n, the microprocessor exits the routine at block 130. If not, the microprocessor moves to block 122 where Y is incremented and to block 124 where Y is compared to the maximum number of columns m. If Y is greater than m, the routine moves to block 120 where it resets Y and then moves to block 116. Otherwise, the routine moves to block 126 where it looks up in random access memory 92 the pixel command corresponding to position X, Y in the mirror matrix of the deformable mirror device 20.

The pixel command represents, either the first state or the second state, indicating whether the mirror at that pixel should reflect light toward a light path so it will be seen by a vehicle operator or away from a light path, so as not to be seen. The pixel commands are output at block 128 along with the X and Y values so that the decoder drivers 96, 98 can drive the pixel located at position X, Y in accordance with the pixel command found at block 126.

The routine shown in FIG. 10 provides two states for each pixel. The routine can be easily modified as shown in FIG. 11 to provide gray scale, enhancing the number and type of images provided and providing for an option of a video type display.

Gray scale is achieved by duty factor modulation, i.e., pixels having different gray levels are turned on for different times during one frame. The observer's eye integrates the duty factor brightness modulation to give a perceived gray level, that is, a brightness less than that of a pixel that is on for the full frame time. To achieve this duty factor modulation, the deformable mirror device is re-addressed several times in one frame period. The number of addressing cycles in each full frame time is equal to the number of gray levels achievable. For example, if four gray levels are required, the array must be addressed four times each full frame period. After the array is addressed four times, the process is repeated for the next frame. Thus, the addressing frequency increases in proportion to the number of gray levels required. For a frame rate of 30 Hz and four gray levels, the array is readdressed at rate of 120 Hz, or every 8.33 ms.

Figure 11:
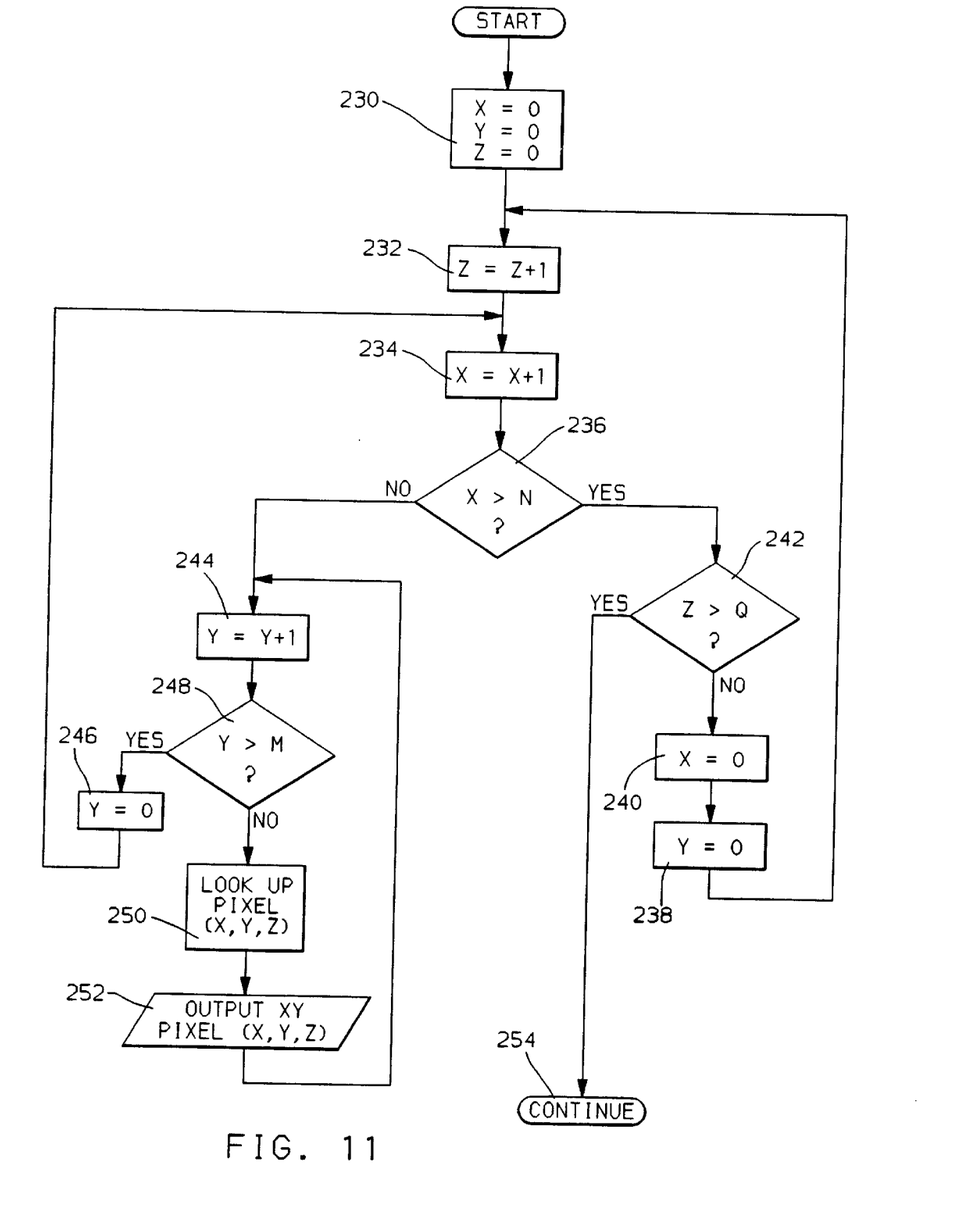

Referring to FIG. 11, the control routine represented by blocks 230–254 provides Q evenly spaced gray levels using re-addressing. Variables X and Y are the pixel pointers and variable z is the re-addressing pointer. The deformable mirror device array is re-addressed Q times in one frame period. In each re-addressing, pixels are turned off to obtained the desired gray level. If a given pixel is to have the lowest non-zero brightness level, it is turned off during the first re-addressing cycle and stays off until the beginning of the next frame.

Figure 12:
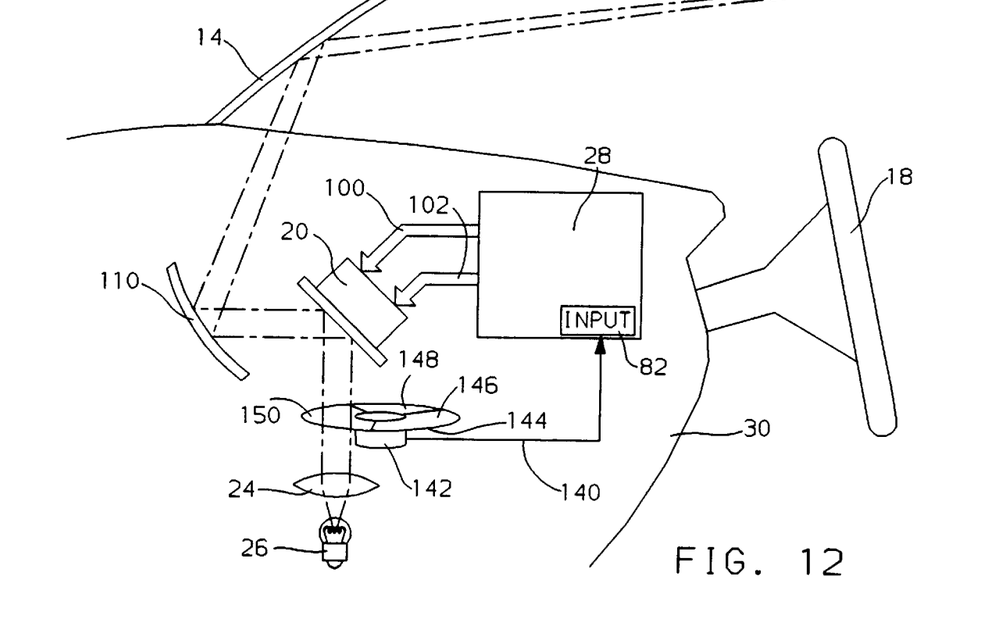
FIG. 12 illustrates an apparatus according to this invention for projecting multicolor display images.

Referring to FIG. 12, the optics in the implementation shown include aspheric mirror 110, which reflects an image of the deformable mirror device 20 onto vehicle windshield 14, which projects the image that is viewed by the vehicle operator. The aspheric mirror 110 is formed with an aspheric reflective surface designed to compensate for the aspheric surface of the vehicle windshield 14. Aspheric mirrors, such as mirror 110 can be easily designed for any specific vehicle windshield by those skilled in the art using a ray tracing program. An example ray tracing program is Code 5™, commercially available for licensed use from Optical Research Associates (ORA), Pasadena, Calif.

The apparatus shown in FIG. 12 projects color images. A motor 142 rotates a color wheel 144 having three portions 146, 148 and 150, each portion representing one of red, blue and green color filters. Line 140 provides synchronizing information to the electronic control unit 28 through the input device 82. Deformable mirror device 20 is modulated in a synchronous manner with color wheel 144 by electronics 28 through buses 100 and 102 to achieve conventional color mixing.

Figure 13:
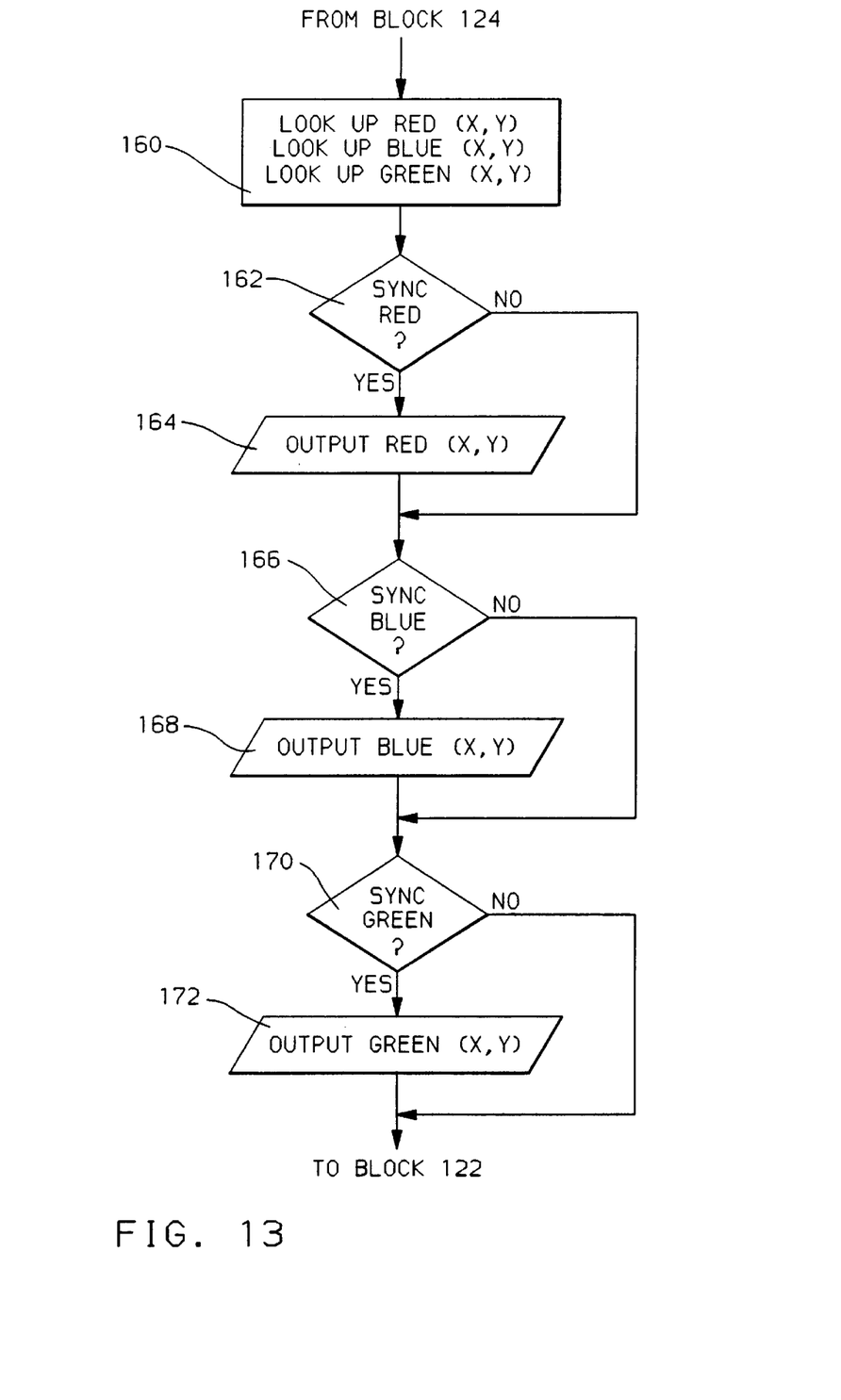
FIG. 13 comprises a flow diagram for use with the implementation of this invention shown in FIG. 12.

The routine shown in FIG. 13 can be used to provide the modulation control necessary to achieve color displays with the apparatus set forth in FIG. 12 and the microprocessor control system shown in FIG. 9. In general, the routine shown in FIG. 13 writes the red, blue and green full color fields sequentially, addressing the array three full times during each frame.

The routine in FIG. 13 is identical to that shown in FIG. 10 up through blocks 124. After block 124, the routine moves to block 160 where it looks up red, blue and green pixel commands for the specific X, Y pixel. At block 162, the routine determines if the red color filter is in front of the light source, and, if so, moves to block 164 to where the red pixel command for position X, Y is output. Blocks 166, 168, 170 and 172 operate similarly for the blue and green commands. After block 172, the routine returns to block 122.

The routine shown in FIG. 13 provides only two states for each red, blue and green command. However, gray scale states for each red, blue and green color component can be easily implemented by inserting the routine shown in FIG. 11 for each of the red, blue and green output commands to drive a full color display.

The above described apparatus of this invention is set forth with reference to an electrostatic deformable mirror device. As a substitute for the electrostatic deformable mirror device shown, any deformable mirror device that has a matrix of individually addressable mirror components may be used, including piezoelectric type deformable mirror devices. The deformable mirror device shown is explained as having the mirrors mounted on a substrate with a matrix of addressing transistors of the type commonly used in deformable mirror devices and similar to the type used to address matrix liquid crystal displays. Because these matrices of addressing transistors are well known to those skilled in the art, they are not set forth in further detail here.

Figure 14:
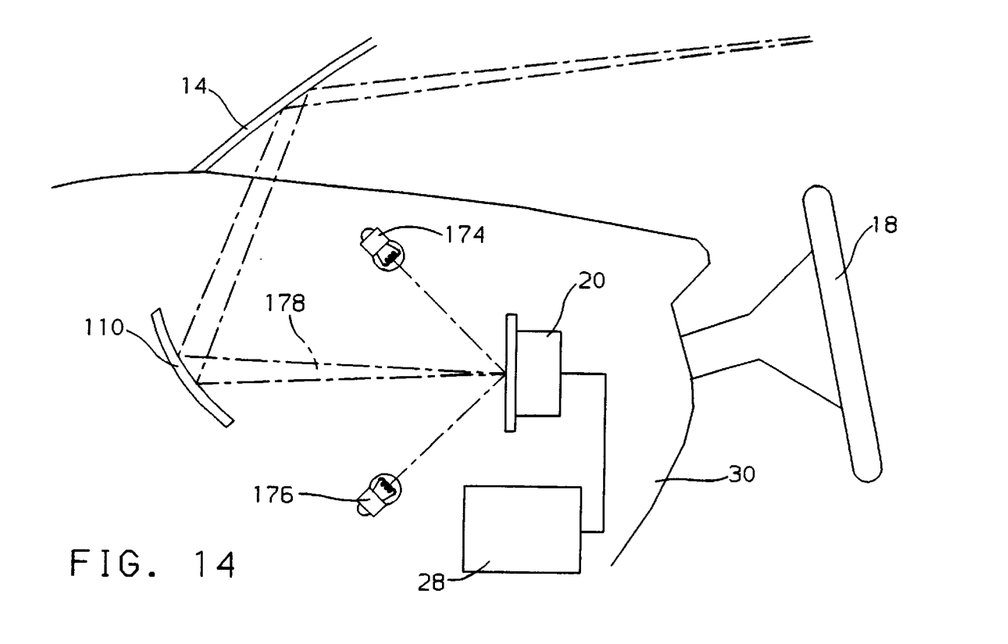
FIG. 14 illustrates a two-color display apparatus according to this invention.

The implementation of this invention shown in FIG. 14 includes two light sources 174 and 176. The first light source 174 provides light of a first color and is positioned so that mirrors in the first state reflect light from this light source into the light path 128. The second light source 176 of a second color is positioned so that the mirrors in the second state reflect light from the second light source 176 into the light path 12. The light path 178 is reflected off of aspheric mirror 110 and projected by windshield 14 to provide a display with two contrasting colors.

The light sources used with this invention may comprise any suitable light sources, including but not limited to incandescent light sources, laser light sources, high intensity gas discharge light sources and LED light sources.

Figure 15:
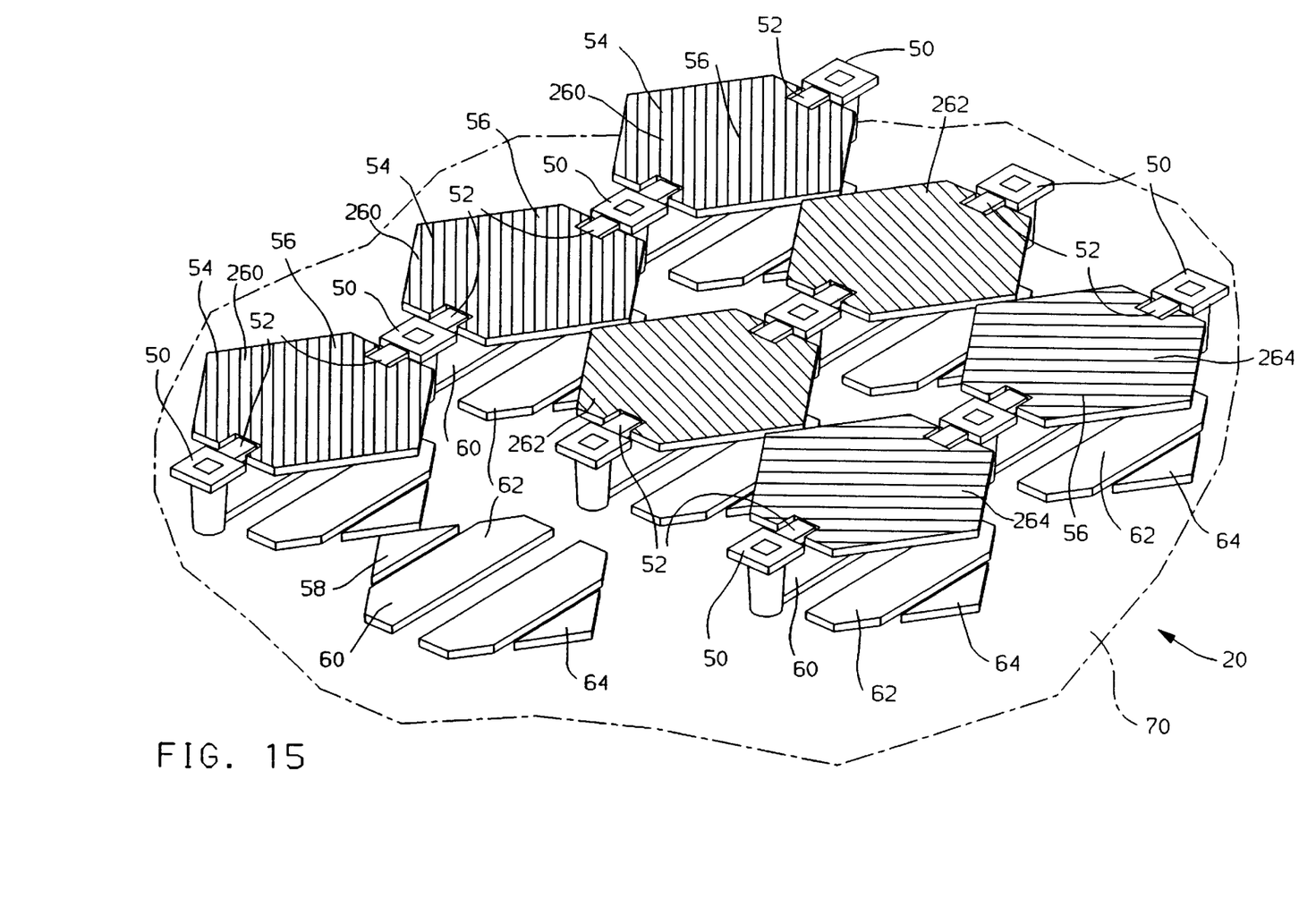
FIG. 15 illustrates a second example apparatus according to this invention for projecting multicolor display images.

FIG. 15 illustrates the preferred method of providing multicolor deformable mirror device for use in vehicle displays according to this invention. On the deformable mirror device shown, red, green and blue microfilters 260, 262, and 264 are deposited directly on the mirrors 56. Microfilters 260, 262 and 264 are color filter layers similar to those used in color active matrix liquid crystal displays and are deposited on the mirrors 56 by standard photolithographic techniques well known to those skilled in the art.

When the addressed pixels reflect light into the field of view of the observer, the microfilters 260, 262 and 264 color the reflected light according to the colors of the microfilters.

In a color display of the type shown in FIG. 15, one full color pixel consists of three individually addressable color deformable mirrors, one red (260), one blue (262) and one green (264). The combination of red, blue and green light from the three pixels making up each color pixel triad is perceived as one color by a viewer of the display according to well known laws of color light mixing. If there is no gray scale implementation, the display shown can achieve eight colors. The number of colors (palette) achievable by the display significantly increases as the number of gray levels increases and more of the CIE color coordinate space is accessible.

Multicolored displays using less than three primary colors may be implemented in a manner similar to that shown in FIG. 15. Fewer colors generally means lower process complexity and lower cost, while still providing a display suitable for automotive applications. For example, an implementation with red, blue and white (no color filter) pixels would allow one to show general information in white, emergency condition information in red, high beam indicator in blue, and other information in red+blue=purple. Mixing white and colored light provides tints that can be used for pleasing stylistic effects.

Figure 16:
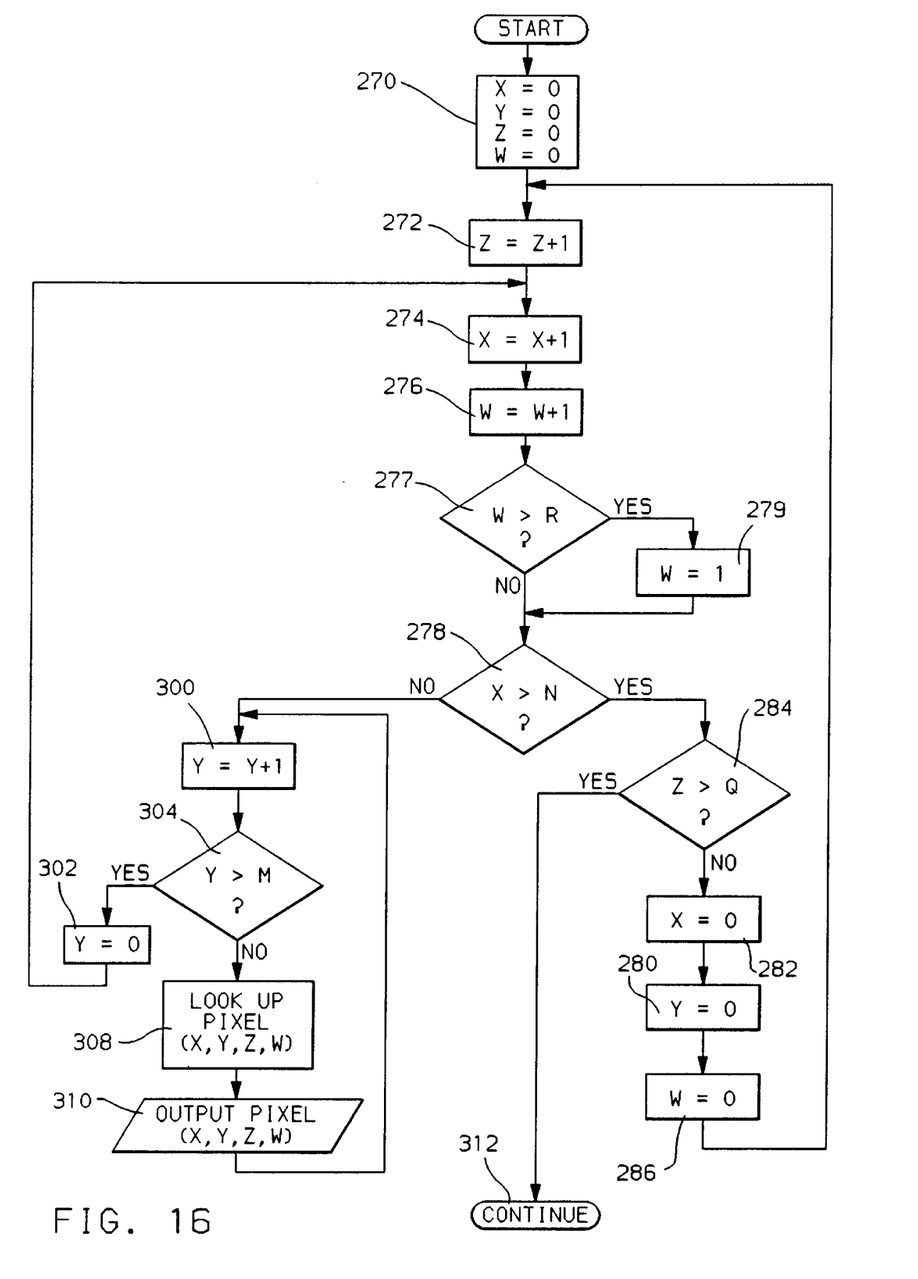
FIG. 16 is a flow diagram for control of a multicolor deformable mirror device according to this invention.

FIG. 16 illustrates a flow routine for providing a multi-color image with gray scale according to this invention. Blocks 270–312 operate similarly to the routines shown in FIGS. 10 and 11, with the addition of variable, w, for identifying the color of the pixel. For example, w=1 represents red, w=2 represents green and v=3 represents blue. The variable R represents the number of colors on the mirrors. In the example shown, there are red, green and blue mirrors, setting R=3. The control routine shown is well suited for the color pixel arrangement shown in FIG. 15. Those skilled in the art can easily implement different color pixel triad arrangements, and vary the control routine shown in FIG. 16 accordingly.

The apparatus of this invention can be used in a variety of ways. A small deformable mirror device can be used to shown basic information if desired. For example, deformable mirror device 20 may comprise a matrix of 64×40 addressable mirrors, requiring only a 2 mm×2 mm device implemented to show basic information such as vehicle speed or fuel level. Larger matrixes may be implemented to provide more information such as climate control information, radio station information, etc. One implementation of this invention includes a large matrix device of at least 200 pixels×700 pixels. Such a device may be coupled to the output of an infrared sensor such as the type used in night vision systems so that a night vision image is projected onto the windshield. This implementation of the invention can be easily accomplished by those skilled in the arts dealing with night vision sensors and video systems.

Correcting for Windshield Distortions with Image Distortion

When the automotive windshield is used as an optical element of the head up display system, as shown in FIG. 1, distortion may be added to the head up display system because of the generally poor optical quality of typical automotive windshields. The windshield glass may have ripples or other optical defects that distort the image seen by the driver, and these optical distortions may vary from windshield to windshield due to manufacturing tolerances. Additionally, windshields for different vehicles have different curvatures.

Distortions caused by vehicle windshields can be at least partially corrected by distorting the pattern of pixels activated on the deformable mirror device to compensate for the distortions caused by the curvature of the windshield. For example, a normally vertical line, such as appears in the numeral "4", might be curved concave to the left by distortions in the windshield when projected in the head up display image. To correct for this type of distortion, relevant pixels on the deformable mirror device that are activated to form this vertical line are changed from pixels that are in a straight line to pixels that are curved concave to the right (or concave to the left, if other optical elements are present that invert the direction of curvature perceived by the driver).

The degree of "curvature" or compensation for windshield distortion that is programmed into the deformable mirror device pixels can be factory set at the time the vehicle is manufactured, or preferably, is responsive to controls that permit driver adjustment of both vertical and horizontal curvature. Providing driver adjustment is advantageous because drivers of different sizes sit in different positions, and view the projected image off of different areas of the windshield. Implementation of this type of image distortion may require a deformable mirror device with a larger number of pixels than would be necessary if no image distortion correction is implemented.

Correcting for Image Distortion Using Gray Scale

Another form of image distortion that may be caused by the automotive windshield is the occurrence of a double image due to reflection of the projected image off of both the inside and outside reflecting surfaces of the windshield. The double image consists of two projected image optically displaced from each other by a small distance and is generally not aesthetically pleasing for the driver. Known methods to combat this problem include use of a reflective coating on the vehicle windshield or use of a wedged windshield.

According to the present invention, the appearance of a double image can be minimized without the use of a reflective coating or a wedged windshield. The effect of the double image can be made less noticeable by "softening" the edges of the projected image. This softening of the edge of the image is achieved by surrounding the periphery of the activated pixels on the deformable mirror device with pixels that are activated a smaller fraction of the time, i.e., using gray scale. The "next nearest neighbor" pixels may be activated with a smaller duty cycle than the pixels that are "nearest neighbors" to the periphery of the fully activated pixels, causing the edges of the image to be less distinct and the double image to be less noticeable.

Generally, with automotive applications, the two images of the double image are vertically displaced from each other more than they are horizontally displaced. Thus, relatively horizontal lines or edges may be softened more than vertical lines or edges, if desired.

Light Divergence

The projected light from the display must reach the driver's eyes and illuminate a region both above and below the driver's eyes to compensate for driver movement and for different size drivers. This may be accomplished by control of the divergence of light from the light source. Divergence control may be accomplished through the size and shape of the light source. For example, a larger frosted glass light source may be used. Also, a lens can be put into the optical path to change the divergence of the light.

Figure 17:
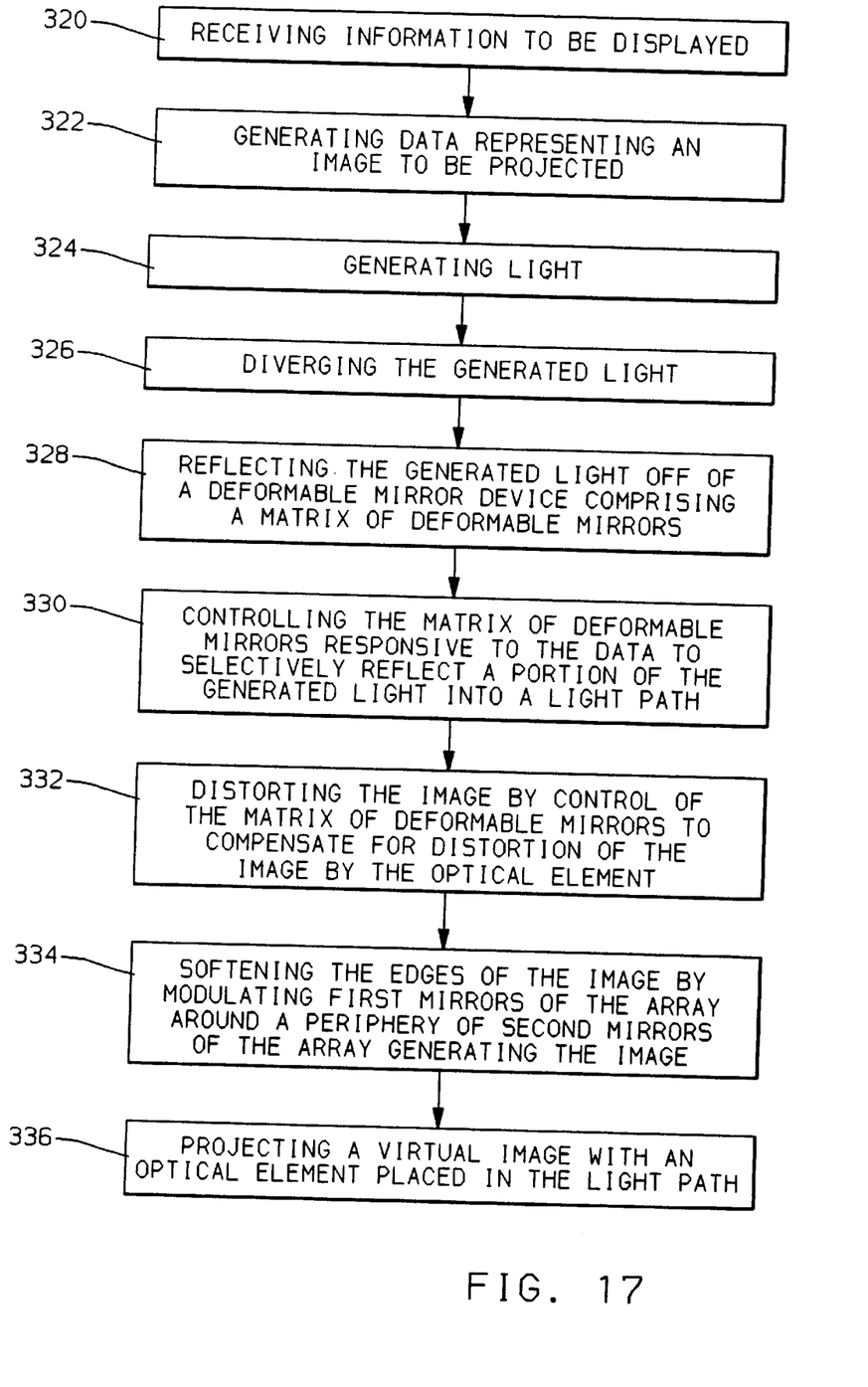
FIG. 17 is an illustration of the method of this invention.

Referring to FIG. 17, the method of this invention is illustrated and comprises the steps of: receiving information to be displayed (block 320) such as vehicle speed information from a standard vehicle information system or the vehicle control unit; generating data representing an image to be projected (block 322), i.e., generating the pixel information in a manner well known to those skilled in the art; generating light (block 324) with a light source; diverging the generated light (block 326) with the size/shape of the light source or with a diverging lens; reflecting the generated light off of a deformable mirror device comprising a matrix of deformable mirrors (block 328); controlling the matrix of deformable mirrors responsive to the data to selectively reflect a portion of the generated light into a light path (block 330), i.e., in the manners described above; distorting the image by control of the matrix of deformable mirrors to compensate for distortion of the image by the optical element (block 332), i.e., in the manner described above; softening the edges of the image by modulating first mirrors of the array around a periphery of second mirrors of the array generating the image (block 334); projecting a virtual image with an optical element placed in the light path (block 336), i.e., the vehicle windshield or a spherical mirror.

Many other improvements and modifications to this invention may occur to those skilled in the art and those improvements and modifications will fall within the scope of this invention as set forth below.

The embodiments of the invention in which an exclusive property or privilege is claimed are defined as follows:

1. A vehicle instrumentation apparatus comprising a deformable mirror device having a matrix of mirrors, each mirror in the matrix individually controllable between at least two states to provide information to a vehicle operator wherein a windshield projects an image of a display created by the deformable mirror device, wherein the image is projected as a double image due to reflection of the image off of both an inside reflecting surface and an outside reflecting surface of the windshield, the apparatus also comprising, means for modulating first mirrors of the array around a periphery of second mirrors of the array generating the display, thereby surrounding the periphery of the second mirrors on the deformable mirror device with the first mirrors that are activated a smaller fraction of the time than the second mirrors are activated, thereby softening the edges of the display and the projected image to reduce perception of the double image by the vehicle operator.

2. An apparatus comprising:

a light source;

a deformable mirror device comprising a matrix of individually controllable mirrors, each controllable mirror having first state reflecting light from the light source into a light path and a second state reflecting light from the light source away from the light path to form a display; and an optical element disposed in the light path projecting a virtual image of the display formed by the deformable mirror device wherein the virtual image conveys information to a viewer of the projected image, wherein the optical element comprises a vehicle windshield, wherein the windshield projects the virtual image as a double image due to reflection of the virtual image off of both an inside reflecting surface and an outside reflecting surface of the windshield, the apparatus also comprising, means for modulating first mirrors of the array around a periphery of second mirrors of the array generating the display, thereby surrounding the periphery of the second mirrors on the deformable mirror device with the first mirrors that are activated a smaller fraction of the time than the second mirrors are activated, thereby softening the edges of the display formed by the deformable mirror device to reduce perception by the viewer of the double image.

3. A method of displaying information in an automotive vehicle, comprising the steps of:

receiving the information to be displayed;

generating data representing an image to be projected;

generating light;

reflecting the generated light off of a deformable mirror device comprising a matrix of deformable mirrors;

controlling the matrix of deformable mirrors responsive to the data to selectively activate mirrors to selectively reflect a portion of the generated light into a light path; and projecting a virtual image with an optical element placed in the light path wherein the optical element projects the virtual image off of both an inside reflecting surface and an outside reflecting surface of the optical element, forming a double image, also comprising the step of softening the edges of the virtual image by modulating additional mirrors of the array around a periphery of the activated mirrors of the array generating the image, thereby surrounding the periphery of the activated mirrors on the deformable mirror device with the additional mirrors that are activated a smaller fraction of the time than the activated mirrors, thereby reducing perception of the double image.

* * * * *